Jan. 3, 1956  E. O. SCHWEITZER, JR  2,729,788
ELECTRIC MEASURING INSTRUMENT
Filed Dec. 29, 1951
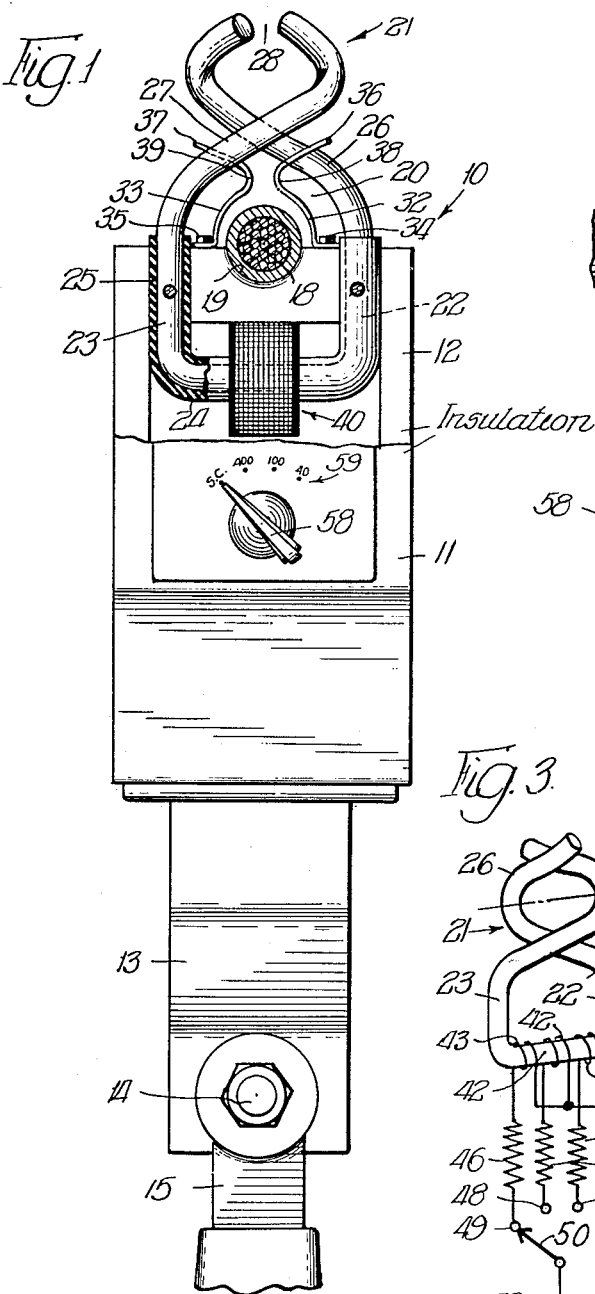
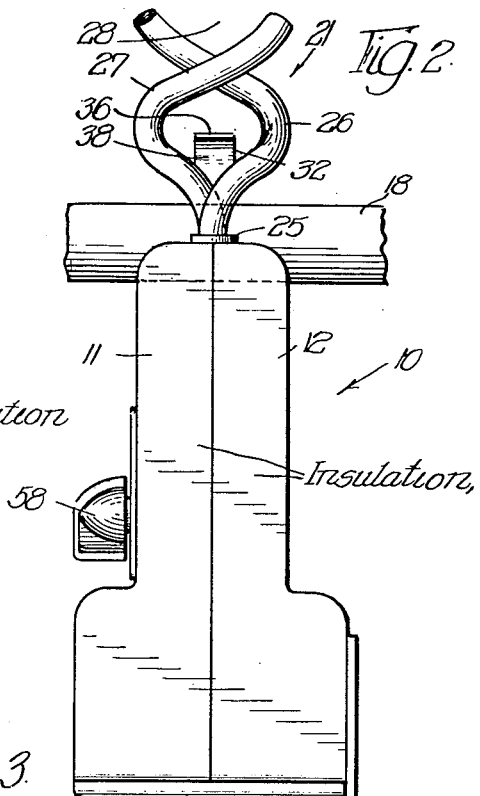
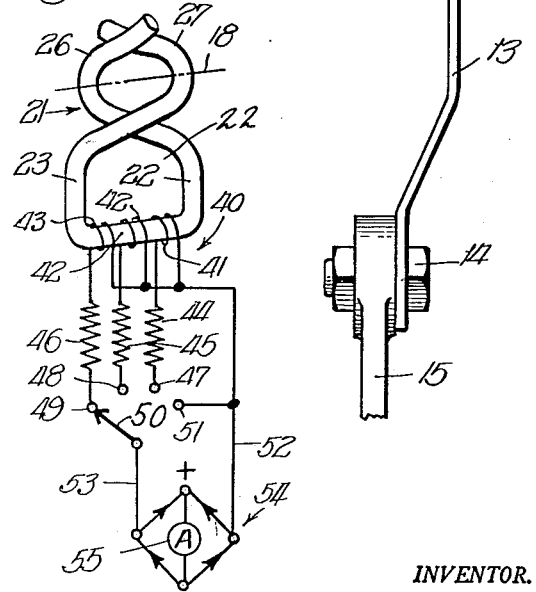
INVENTOR.
Edmund O. Schweitzer, Jr.,
BY
Robert R. Lockwood
ATTY.

United States Patent Office 2,729,788
Patented Jan. 3, 1956

2,729,788

ELECTRIC MEASURING INSTRUMENT

Edmund O. Schweitzer, Jr., Northbrook, Ill., assignor to E. O. Schweitzer Manufacturing Co., Inc., Northbrook, Ill., a corporation of Illinois Application December 29, 1951, Serial No. 264,121

2 Claims. (Cl. 324—127)

This invention relates, generally, to electric measuring instruments, and it has particular relation to devices for measuring the flow of alternating current in high voltage electric power transmission lines. This invention is an improvement over the invention disclosed in Patent No. 2,375,591, issued May 8, 1945, and over the invention disclosed in copending application Serial No. 109,537, filed August 10, 1949.

Among the objects of this invention are: To minimize the error due to leakage or stray alternating magnetic fields which might otherwise affect the accuracy of the instrument; to reduce the reluctance of the fixed air gap in the magnetic core of a transformer used for measuring alternating current flow in high voltage electric power transmission lines; to employ spiralled spaced apart arms constituting parts of the magnetic core for accomplishing these ends; to hold the instrument in operative relation to the conductor independently of the usual support therefor; and to employ spring clip means for this purpose.

Other objects of this invention will, in part, be obvious and in part appear hereinafter.

This invention is disclosed in the embodiment thereof shown in the accompanying drawing and it comprises the features of construction, combination of elements and arrangement of parts which will be exemplified in the construction hereinafter set forth and the scope of the application of which will be indicated in the appended claims.

For a more complete understanding of the nature and scope of this invention, reference may be had to the following detailed description, taken together with the accompanying drawing, in which:

Figure 1 is a top plan view of an electric measuring instrument constructed in accordance with this invention, a part of the case being broken away in order to show the internal details of construction;

Figure 2 is a view, in side elevation, of the instrument shown in Figure 1; and

Figure 3 is a perspective view of the magnetic core structure employed in the instrument shown in Figures 1 and 2 and in addition it includes a diagrammatic representation of the circuits which are employed in conjunction with the magnetic core structure for the purpose of measuring the flow of current through a conductor with which the core structure is associated.

Referring now particularly to the drawing, it will be observed that the reference character 10 designates, generally, a measuring instrument which is provided with an insulating case comprising an upper casing section 11 and a lower casing section 12. The casing sections are formed of suitable insulating material such as a phenolic condensation product, methyl methacrylate resin, etc. Attached to the lower casing section is a bracket 13 which is offset from the underside of the section 12. Attached to the bracket 13 by a bolt 14 is an arm 15 which it will be understood is carried by a live line stick that is manipulated by a line man for handling the measuring instrument 10 for the purpose of placing it in operative relation with respect to a conductor 18 the flow of alternating current through which is to be measured.

With a view to accommodating the alternating current conductor 18 and locating it with respect to the casing sections 11 and 12, they are provided with a transversely extending groove 19 into which the conductor 18 fits. It will be observed that the groove 19 extends generally normal to a generally rectangularly shaped window 20 that is formed by a magnetic core 21. The magnetic core 21 includes coplanar sides 22 and 23 which are joined by an end section 24. Surrounding the sides 22 and 23 and the end section 24 is a sleeve of insulating material such as a sleeve 25 of soft rubber or the like. Because of the use of the sleeve 25, as described, it is unnecessary to hold the dimensions of the casing sections 11 and 12 and of the magnetic core 21 within close tolerances.

In order to admit the conductor 18 into the generally rectangularly shaped window 20, there is provided a construction on the open side of the window 20 for this purpose. As illustrated the sides 22 and 23 have extensions in the form of spiralled arms 26 and 27. It will be noted that the arms 26 and 27 are generally cork screw like arms and that between them they define a permanent air gap 28 which is wide enough to permit the entrance of the largest diameter conductor 18 and its insulated covering that it is likely to encounter in the use of the instrument 10. Because of the presence of the permanent air gap 28 in the magnetic core 21, there is provided a substantial amount of reluctance over a magnetic core which constitutes a complete enclosure for the window 20. However, it is necessary to provide the air gap 28 in order to permit the physical entry of the conductor 18 into the window 20. By employing the spiralled or cork screw construction for the arms 26 and 27, there is a substantially greater degree of overlap of the portions of the magnetic circuit along the air gap 28 and thus its reluctance is greatly reduced. Also because of the oppositely extending portions of the spiralled arms 26 and 27 the induction due to leakage or stray magnetic fields is greatly reduced and they have substantially no effect on the accuracy of the device. Another advantage of the spiralled or cork screw construction for the arms 26 and 27 is that it reduces substantially the space within the window 20 above the groove 19 where the conductor 18 can be located. This further improves the accuracy of the instrument since the space within the window 20 where the conductor 18 can be located is reduced and consequently it makes little difference where the conductor 18 is placed above the groove 19 within the window 20 as long as the conductor 18 generally is at right angles to the casing sections 11 and 12 as shown in Figures 1 and 2 of the drawing.

It may be desirable to remove the normal supporting force which is transmitted through the live line stick to the arm 15 and bracket 13. In such case it is desirable to support the instrument 10 from the conductor 18. For this purpose spring clips 32 and 33 are employed and they are secured by screws 34 and 35 to the casing sections 11 and 12. The spring clips have outflared ends 36 and 37 which facilitate the entry of the conductor 18 into the groove 19 and they also have inwardly bowed portions 38 and 39 which are closely spaced and they are inherently of sufficient rigidity so as to support the weight of the measuring instrument 10 and the live line stick attached thereto. However, they are sufficiently resilient so that when a pull is exerted on the live line stick the spring clips 32 and 33 will be sprung apart sufficiently far to permit the exit of the conductor 18 from the window 20.

In order to measure the current flow through the conductor 18 windings 40 are provided on the end section 24 of the magnetic core 21. As shown more clearly in Figure 3 of the drawing, the winding 40 is made up of three windings 41, 42 and 43 in order to accommodate different current ranges. These windings are connected through resistors 44, 45 and 46, respectively, to contacts 47, 48 and 49. A contact arm 50 is arranged to be swung past these contacts for selecting the particular range that is desired. For example, the full scale deflection may be 40-amperes or 100-amperes or 400-amperes depending upon the particular setting of the contact arm. There is also provided a contact 51 which, when the contact arm 50 is in engagement therewith provides a short circuit around the measuring device itself. The windings 40 are commonly connected by a conductor 52 to one side of a rectifier that is indicated, generally, at 54. The contact arm 50 is connected by a conductor 53 to the other side of the rectifier 54. It will be observed that the rectifier 54 is arranged to energize an indicating instrument 55 such as an indicating milliammeter which is provided with properly calibrated scales such as those outlined above.

Any suitable means can be employed shifting the position of the contact arm 50. For example, the pointer 58, shown in Figures 1 and 2 can be connected thereto and located external to the casing sections 11 and 12. The pointer 58 is movable over a scale 59 which indicates the particular contact button with which the contact arm 50 is in engagement.

In placing the measuring instrument 50 in operative position with respect to the conductor 18, the lineman lifts it by means of the live line stick and places the upper end of the air gap 28 in register with the conductor 18. Then he continues to move the instrument 10 upwardly and at the same time rotates it about its longitudinal axis through 180° to cause the conductor 18 to enter the generally rectangularly shaped window 20 between the spiralled or cork screw like arms 26 and 27. When the conductor 18 encounters the outflared ends 36 and 37 of the spring clips 32 and 33, the lineman provides an additional upward thrust which causes the spring clips 32 and 33 to be separated as the conductor 18 is moved downwardly relatively past the inwardly bowed portions 38 and 39. The measuring instrument 10 can be left hanging on the conductor 18 where it will be held in position by the spring clips 32 and 33. When it is desired to remove the instrument 10 from operative relation with respect to the conductor 18, the foregoing sequence of operations is reversed.

It will be understood that the conductor 18 ordinarily will be energized at a relatively high voltage. For example, it may be energized at voltages ranging upwardly from 2300 volts.

Since certain changes can be made in the foregoing construction and different embodiments of the invention can be made without departing from the spirit and scope thereof, it is intended that all matter shown in the accompanying drawing and described hereinbefore shall be interpreted as illustrative and not in a limiting sense.

What is claimed as new is:

1. Means for measuring alternating current flow in a conductor comprising, in combination, a magnetic core structure defining a generally rectangular window open on one end with the sides beyond said open end having spaced cork screw like arms intertwined with each other and defining a permanently open entrance slot therebetween through which said conductor is adapted to enter said window, and a measuring winding linking said core structure for measuring the current flow in said conductor.

2. Means for measuring alternating current flow in a conductor comprising, in combination, a magnetic core structure defining a generally rectangular window open on one end with the sides beyond said open end having spaced cork screw like arms intertwined with each other and defining a permanently open entrance slot therebetween through which said conductor is adapted to enter said window, an insulating case supporting said magnetic core structure with said spaced arms and said window external thereto and having a groove extending generally normal to said window for receiving said conductor in a predetermined position therein, and a measuring winding linking said core structure for measuring the current flow in said conductor.

References Cited in the file of this patent

UNITED STATES PATENTS

| | | |
|---|---|---|
| Re. 20,290 | Stanton | Mar. 9, 1937 |
| 750,525 | Everest | Jan. 26, 1904 |
| 2,089,083 | Arey | Aug. 3, 1937 |
| 2,146,555 | Arey | Feb. 7, 1939 |
| 2,375,591 | Schweitzer | May 8, 1945 |